E. Z. LEWIS.
MANIFOLDING SALES BOOK.
APPLICATION FILED APR. 6, 1918.
1,322,702.
Patented Nov. 25, 1919.
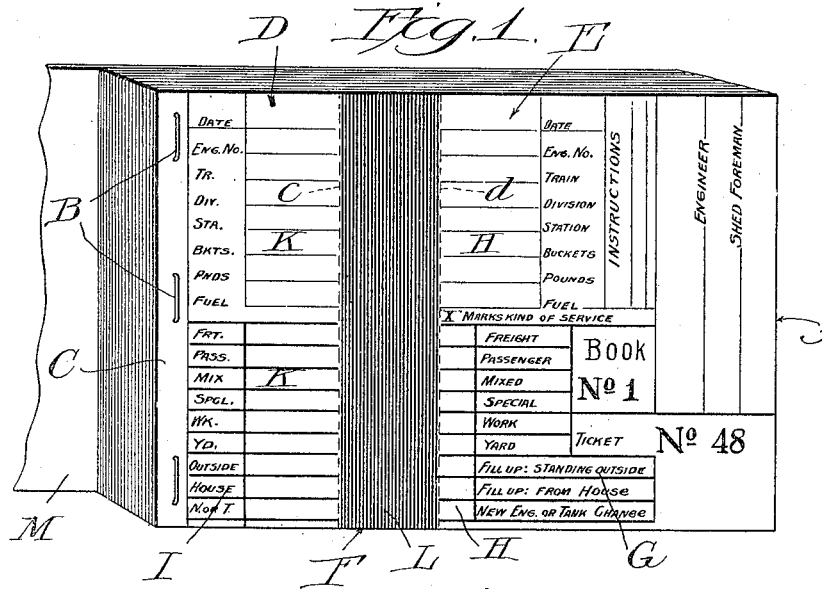
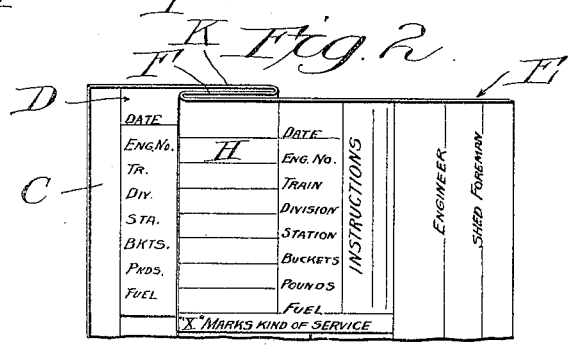
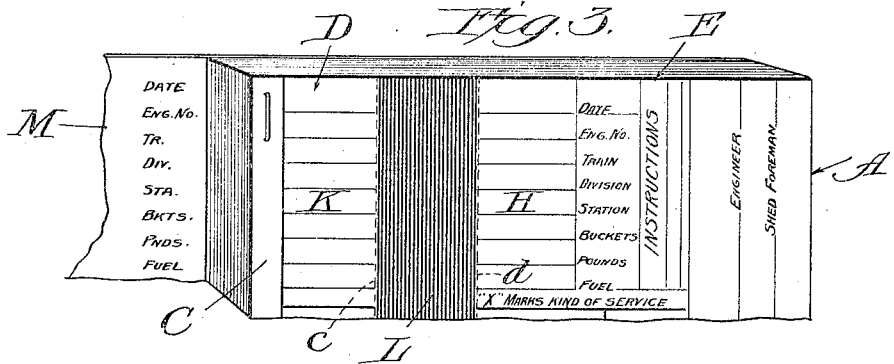

UNITED STATES PATENT OFFICE.

EDWARD ZUVER LEWIS, OF CHICAGO, ILLINOIS, ASSIGNOR TO THE GENERAL MANIFOLD AND PRINTING COMPANY, OF FRANKLIN, PENNSYLVANIA, A CORPORATION OF PENNSYLVANIA.

MANIFOLDING SALES-BOOK.

1,322,702.  Specification of Letters Patent.  Patented Nov. 25, 1919.

Application filed April 6, 1918. Serial No. 226,981.

*To all whom it may concern:*

Be it known that I, EDWARD ZUVER LEWIS, a citizen of the United States, and a resident of Chicago, in the county of Cook and State of Illinois, have invented certain new and useful Improvements in Manifolding Sales-Books; and I do hereby declare that the following is a full, clear, and exact description thereof, reference being had to the accompanying drawings, and to the letters of reference marked thereon, which form a part of this specification.

My invention relates to new and useful improvements in manifolding salesbooks, memorandum pads and the like, of that class wherein an original record is made upon a detachable portion of the sheet and a duplicate of said record is simultaneously made upon another portion of the sheet, the latter being preferably, retained as a permanent record of the transaction.

One object of the invention is to provide a book or pad of such construction and arrangement as to afford the greatest amount of convenience to the person using the same, with the minimum amount of work in its manipulation and use, and at the same time, a book or pad which will be of such size as to accommodate all the necessary printed form, subject matter and proper spacing to receive the original record, while at the same time, economizing to the greatest degree in the size of the individual sheet and the paper required to form both records.

Another object of the invention is to produce a structure wherein a portion of the sheet may be folded over another portion of the same sheet in such manner that the space on the one for receiving the original written record when said sheet is folded will be directly over the space on the sheet designed for the duplicate record and with the necessary transfer medium between them, whereby both the original and the offset writings may be made only upon the two parts of the one sheet and without the intervention of a stop card between said sheet and the subjacent sheets of the book or pad. That is to say the records will be made upon the two predetermined spaces only of the top sheet of the book or pad and will not be transferred to any of the subjacent sheets.

The printed forms used will vary, of course, with the character of use to which my invention will be put, but the book shown in the accompanying drawings, which is for use in a coal yard, will serve to illustrate the nature of my invention and one embodiment thereof.

In the drawings:

Figure 1 is a perspective view of a book or pad composed of a plurality of sheets, the top one being illustrated in elevation.

Fig. 2 is a view of one of the sheets when folded and ready for writing the original record thereon.

Fig. 3 is a perspective view of a slightly modified form of the invention.

In the embodiment of my invention which I have thus chosen for purposes of illustration, I have selected a form used in railway service in a coal yard, wherein the stub or retained portion of the sheet is arranged to receive the permanent record and wherein a removable section of the sheet is arranged to receive the original written record.

In this class of work, numerals or a mark X for example, are used as far as possible, to designate individuals, stations, etc., so that the person making a record upon this form may economize his time by using the predetermined numeral designation to identify the name of the station, train, division, the name of the engineer, the engine and other data as thereon appears, and will similarly use the X mark to indicate other information desired to be recorded.

Referring now to the drawing, A represents a book or pad as a whole, comprised of a plurality of sheets suitably fastened together by wire stitching B, or otherwise, at their stub ends. Each sheet is composed of a binding stub C for binding purposes, a section D upon which the permanent or retained transferred record will be made; an original record section E and an intermediate carbon coated or other transfer medium section F. The sections D, E and F are separated by means of a series of transversely arranged perforations or weakened lines $c$ and $d$ located on either side of the carbonized section F.

Upon the removable original record section E is printed a predetermined form indicated generally at G. It will be observed that this form is so printed on the right hand or free edge portion of the removable section E, as to leave upon the left hand portion of the section E, namely, that portion adjacent to the carbonized section F, clear spaces h, h, forming columns in which the person using the book or sheet will have occasion to enter the original written record.

The stub section D will contain on its left hand portion, printed forms I, corresponding to and in line with the printed forms G. Upon the right hand portion of this same section D will be clear spaces K, K, alined with the spaces H, H, so that the original writing made in the spaces H, H, of section E, will be reproduced in the corresponding parts of the spaces or columns K, K, by the offset of the carbon or transfer medium L.

In most cases it will be found that the printed form I on the permanent record section D need not be a duplication of the form G in all respects but may be an abbreviation of the full information of the printed form G. By thus abbreviating the individual parts of the form I, it is possible to materially reduce the size of the permanent record section D, and save considerable paper stock.

Upon the face of the intermediate section F, I place a coating of carbon or other suitable transfer medium as indicated by the letter L. It will be noted that the transferring medium is placed on that surface of the section F corresponding to the side on which the printed forms are printed on the sections D and E, that is to say, upon the top and not on the reverse face of the sheet. When the form thus described is ready for use, the carbonized face L of the sheet is folded along the weakened line c so that the carbon surface of the section F is superposed upon and lies directly over the column K of the section D. The removable section E will be folded in the opposite direction along the weakened line d so that the columns or spaces H, H, of the section E are superposed above the carbonized section F, as clearly shown in Fig. 2, the back of the section F and that part of the back of the section G beneath the columns H, H being in juxtaposition.

In this relation it will be manifest that an original record made in the columns H, H, will be reproduced by the transferring medium L of the section F onto the clear spaces or columns K, K of the stub section D. The sections may then be torn apart along the lines c and d and the carbonized section F to be thrown away.

M is the cover of the book and in some cases, I may print the forms I upon the inside of the top leaf of the cover M, as shown in Fig. 3, instead of printing said forms on the stub section D. A further narrowing of the section D and saving of paper is thus effected.

It will be noted that the printed forms or instructions I are formed on the left hand side of the section D, while the printed form G is on the right hand of the section E of the sheet. Thus the writing columns K and H of the sections D and E are on the right and left respectively of the said printed forms I and G, and are adjacent to and of the same width only as the intermediate carbonized section F. It will also be noted that this arrangement, wherein the writing columns K and H are in fixed relation to the section F, permits of the section E being of variable size by lengthening that part of the section to the right of the form G, to accommodate any desirable instructions or data: as for instance, by adding to its length sufficiently to form the writing space N for the reception of matter especial to that particular sheet in use, and which writing in said space N does not have to be duplicated or reproduced.

With this book, it will be found that the user need only place his thumb on the right hand portion of the section E and push or move it toward the section D, and that by reason of the perforations or weakened lines c, d, the sheet, in a sense, automatically falls into the writing position shown in Fig. 2, and that the user does not have to carefully and deliberately crease or fold the sheet on the lines c, d. This, in practice, saves an immense amount of time during a day's use of said books and greatly adds to its value.

Interleaved carbon or transfer sheets are thus avoided. No "stop" card is required. Since there is no carbon or transfer medium on the reverse side of the section D, writing in the column H of the section E is duplicated only in the column K. In practice, it is found that great economy in paper, in time of manipulation for use in writing and convenience and facility of handling the sheet and its parts are effected by the construction described.

I claim as my invention:

1. A book or pad provided with a plurality of sheets, each sheet comprising an original and a duplicate record section, each of which has a printed detail form, a transfer medium section interposed between said original and duplicate sections, each of said original and duplicate sections having a writing space column between the printed detail form and said transfer medium section, the printed forms, writing columns and transfer medium all being on the same face of the sheet, whereby when the sheet is folded along the edges of the transfer section with the transfer medium downward and the face of the original and duplicate sections upward, both printed detail forms are exposed to view.

2. A book or pad provided with a plurality of sheets, each sheet comprising an original and a duplicate record section and a transfer medium section interposed between said original and duplicate sections, a writing space column on the original and the duplicate sections contiguous to the transfer section, and a printed detail form on one of said record sections, with the writing space column between it and the transfer section, said writing columns, transfer medium and detail forms all being on the same face of the sheet, and indicating means showing the proper position of the items in said printed detail form when the sheet is folded along the edges of the transfer medium with the face of said medium downward and the faces of said original and duplicate upward.

3. A book or pad provided with a plurality of sheets, each sheet comprising an original record section and a duplicate record section and an intermediate transfer medium section, the original section being provided with a printing form in detail, the duplicate record section being also provided with a printed form, the printed form of each section being on the outer portion of its section, each record section being also provided with a writing space column adjacent to the intermediate transfer medium section.

In testimony, that I, claim the foregoing as my invention I affix my signature in the presence of two witnesses, this 5th day of March, A. D. 1918.

EDWARD ZUVER LEWIS.

Witnesses:
 TAYLOR E. BROWN,
 KARL N. DOLL.